(12) United States Patent
Peddada et al.

(10) Patent No.: US 10,356,088 B1
(45) Date of Patent: Jul. 16, 2019

(54) USER AUTHENTICATION BASED ON MULTIPLE ASYMMETRIC CRYPTOGRAPHY KEY PAIRS

(71) Applicant: salesforce.com, inc., San Francisco, CA (US)

(72) Inventors: Prasad Peddada, San Francisco, CA (US); Taher Elgamal, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 101 days.

(21) Appl. No.: 15/627,031

(22) Filed: Jun. 19, 2017

Related U.S. Application Data

(63) Continuation-in-part of application No. 15/415,451, filed on Jan. 25, 2017.

(51) Int. Cl.
*H04L 9/08* (2006.01)
*H04L 9/32* (2006.01)
*H04L 29/06* (2006.01)

(52) U.S. Cl.
CPC ........ *H04L 63/0853* (2013.01); *H04L 9/3271* (2013.01); *H04L 63/0435* (2013.01); *H04L 63/0442* (2013.01); *H04L 63/061* (2013.01); *H04L 63/0815* (2013.01); *H04L 63/0876* (2013.01)

(58) Field of Classification Search
CPC ............... H04L 9/3271; H04L 63/0853; H04L 63/0435; H04L 63/0442; H04L 63/061; H04L 63/0815; H04L 63/0876
USPC ........................................................ 713/171
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |

(Continued)

OTHER PUBLICATIONS

Burr et al., Electronic Authentication Guideline, NIST Special Publication 800-63-2, National Institute of Standards and Technology, US Dept. of Commerce, Aug. 2013 http://dx.doi.org/10.6028/NIST.SP.800-63-2 p. 1.

*Primary Examiner* — Haresh N Patel
(74) *Attorney, Agent, or Firm* — Schwabe Williamson & Wyatt

(57) ABSTRACT

An ID service provisioned on a server interacts with a corresponding ID app installed on a user device such as a smart phone for secure user authentication (login). A user acquires two asymmetric encryption keys pairs. One of the private keys is secured on SIM on the user device, and the other one stored in the ID app on the user device. At login attempt, the ID service generates two random challenge messages, and encrypts each of them with one of the public keys. Decryption of one challenge is conducted by the SIM and decryption of the other is done by the ID app. A token based on the two decrypted challenge results is returned to the ID service. Alternatively, a single challenge can be double-wrapped with the two keys. The verifies the results and enables secure login without requiring a password.

13 Claims, 10 Drawing Sheets

(56) References Cited

U.S. PATENT DOCUMENTS

| | | | |
|---|---|---|---|
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,615,350 B1 * | 9/2003 | Schell ............... G06F 21/33 380/30 |
| 6,621,834 B1 | 9/2003 | Scherpbier et al. |
| 6,647,260 B2 | 11/2003 | Dusse |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,880,083 B1 * | 4/2005 | Korn ............... G06F 21/52 713/170 |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,386,720 B2 | 6/2008 | Sandhu |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,849,326 B2 * | 12/2010 | Chao ............... G06F 21/445 380/277 |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,032,927 B2 | 10/2011 | Ross |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,166,299 B2 | 4/2012 | Kemshall |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,649,766 B2 | 2/2014 | Kemshall |
| 9,363,077 B2 | 6/2016 | Kemshall |
| 10,205,588 B2 * | 2/2019 | Hunacek ............... H04L 9/003 726/5 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0138722 A1 * | 9/2002 | Douceur ............... H04L 9/0825 713/153 |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0131114 A1 * | 7/2003 | Scheidt ............... H04L 63/0853 709/229 |
| 2003/0151633 A1 | 8/2003 | George et al. |
| 2003/0159136 A1 | 8/2003 | Huang et al. |

(56) References Cited

U.S. PATENT DOCUMENTS

| | | |
|---|---|---|
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233550 A1* | 12/2003 | Brickell ............... G06F 21/85 713/171 |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0109569 A1* | 6/2004 | Ellison ............ G11B 20/00086 380/277 |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0033392 A1 | 2/2007 | Ganesan |
| 2008/0172730 A1 | 7/2008 | Sandhu |
| 2008/0229104 A1 | 9/2008 | Ju |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0276837 A1* | 11/2009 | Abzarian ............. G06F 21/31 726/5 |
| 2010/0095118 A1* | 4/2010 | Meka ................ G06F 21/6227 713/168 |
| 2011/0055585 A1* | 3/2011 | Lee ...................... H04L 9/0844 713/183 |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2013/0342314 A1* | 12/2013 | Chen ................. G07C 9/00309 340/5.65 |
| 2014/0359537 A1 | 12/2014 | Jackobson et al. |
| 2016/0080157 A1 | 3/2016 | Lundstrom |
| 2016/0134599 A1* | 5/2016 | Ross ..................... H04L 63/08 713/168 |
| 2016/0267738 A1* | 9/2016 | Carstens ............. A47G 29/141 726/5 |
| 2016/0285840 A1* | 9/2016 | Smith ................... H04W 4/70 726/5 |
| 2018/0034625 A1* | 2/2018 | Hunacek .............. G06F 21/445 726/5 |
| 2018/0115546 A1* | 4/2018 | Ito ........................ H04W 4/80 726/5 |
| 2018/0351735 A1* | 12/2018 | Brockhaus ............ G06F 21/44 726/5 |

\* cited by examiner

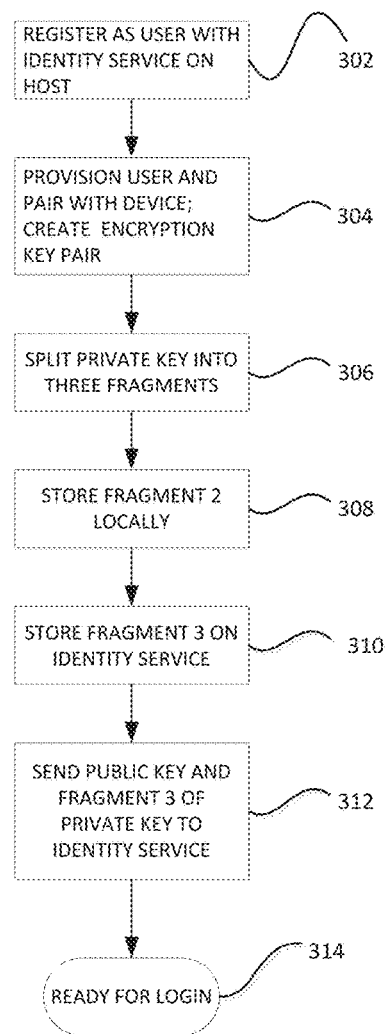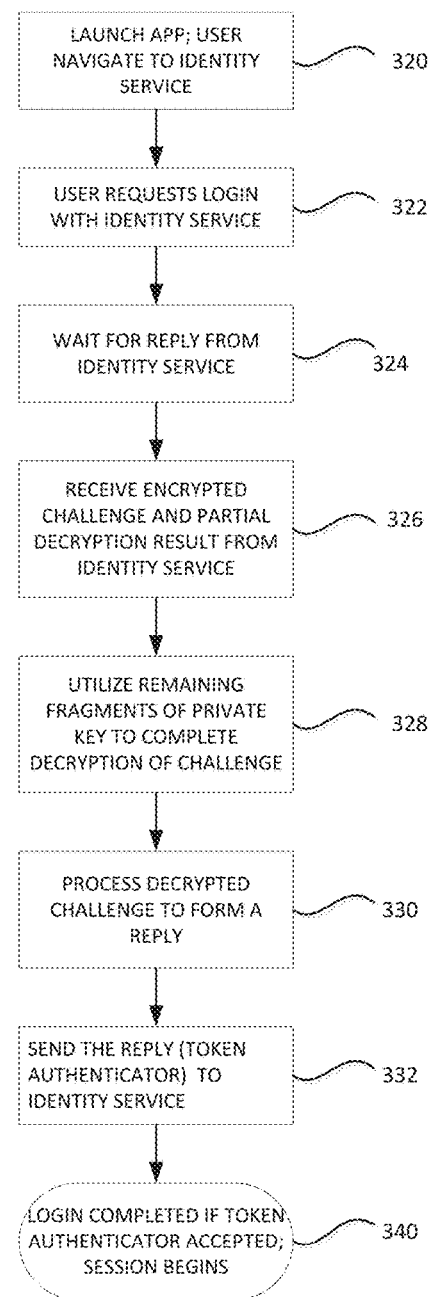
FIG. 3A
FIG. 3B

TOKEN MODEL

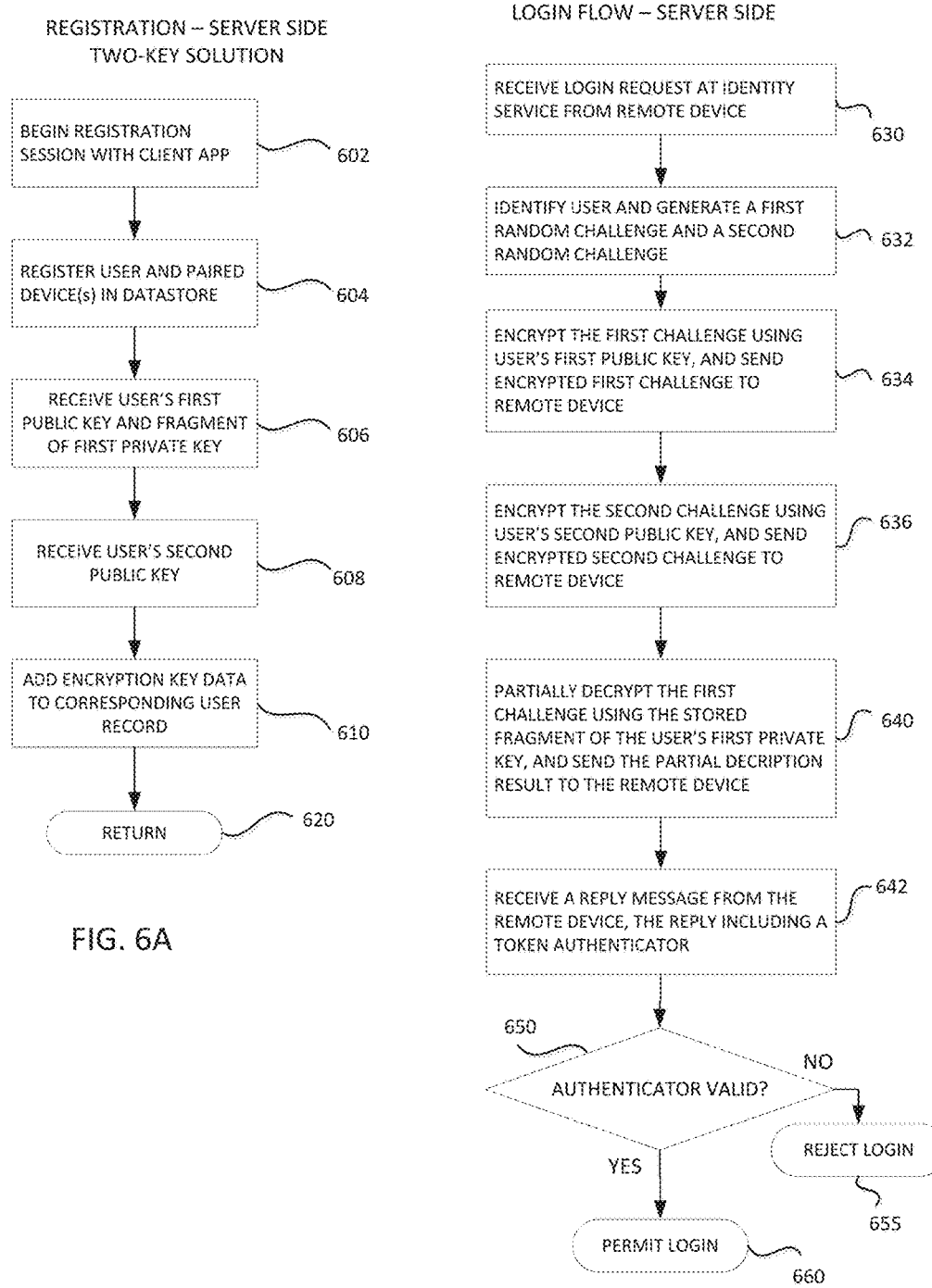

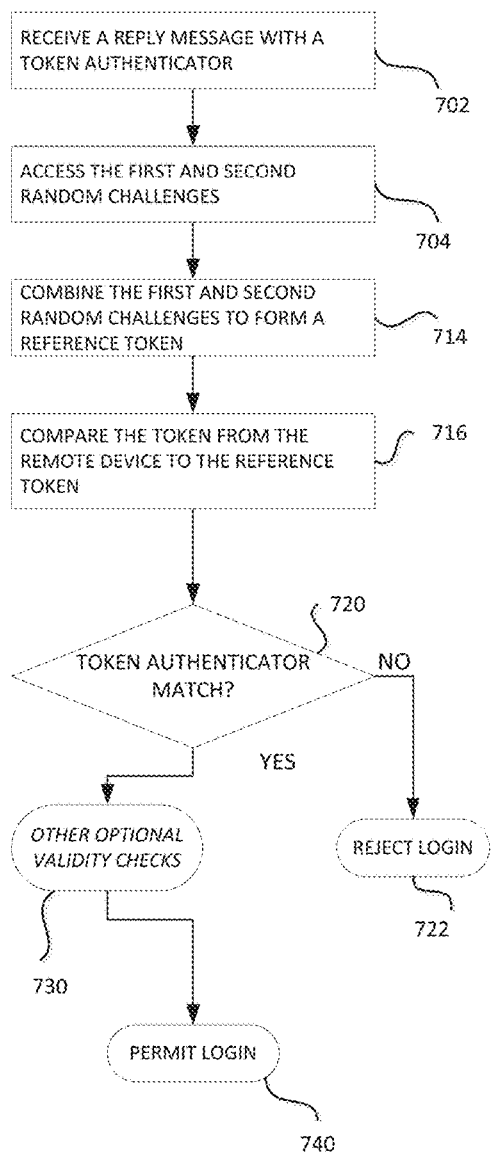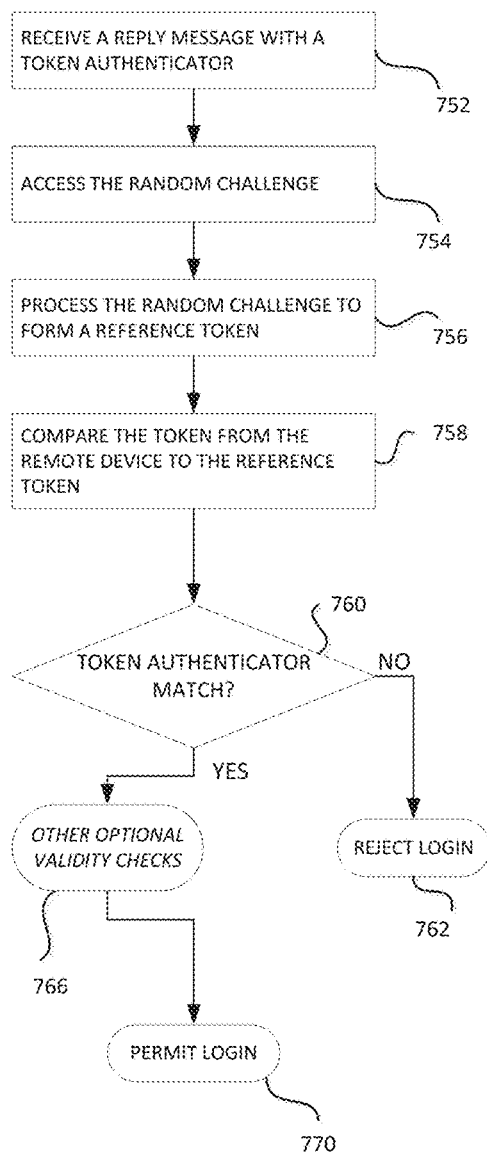
FIG. 7A
FIG. 7B

USER AUTHENTICATION BASED ON MULTIPLE ASYMMETRIC CRYPTOGRAPHY KEY PAIRS

RELATED CASE

This is a continuation-in-part (CIP) of application Ser. No. 15/415,451, now copending, filed Jan. 25, 2017.

COPYRIGHT NOTICE

Copyright 2017 salesforce.com, inc. A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

The technology relates to electronic user authentication to control access to an information system.

BACKGROUND

Historically, access to computing resources and data may be limited to authorized users. Typically, an authorized user may be authenticated by a username-password pair. The password is kept confidential, but storage of passwords on a host presents a risk of compromise, for example, by a hacker. Two-factor authentication improves security, but still requires a password and adds additional burden on the user. Passwords are increasingly problematic because complex passwords are hard to remember for humans; people reuse passwords at several sites, thus increasing the risks; and forced rotation of passwords for compliance reasons often ends up weakening security of the system. The need remains for improvements in user authentication.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 3A shows a simplified flow diagram of an example process for user registration and setup that may be implemented in a client side application.

FIG. 3B shows a simplified flow diagram of an example process for remote user authentication and login that may be implemented in a client side application.

FIG. 6A shows a simplified flow diagram of an example process for user registration and setup for authentication purposes.

FIG. 6B shows a simplified flow diagram of an example server side process for user authentication utilizing two asymmetric cryptography key pairs both associated with the same user.

FIG. 7A is a simplified flow diagram of an example process for checking validity of a token authenticator in connection with a pair of random challenges.

FIG. 7B is a simplified flow diagram of an alternative process for checking validity of a token authenticator in connection with a single challenge that has been double encrypted.

DETAILED DESCRIPTION

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

As noted above, passwords and the like are sorely lacking in security and convenience to limit access to a host system, for example, a database system, application service provider, or telecommunications system. In this disclosure, we describe some examples and embodiments that enable secure remote user authentication leveraging public key cryptography in a new way. These designs obviate the need for a user to remember complex passwords, while improving security.

I. Example System Overview

Figure 1A:
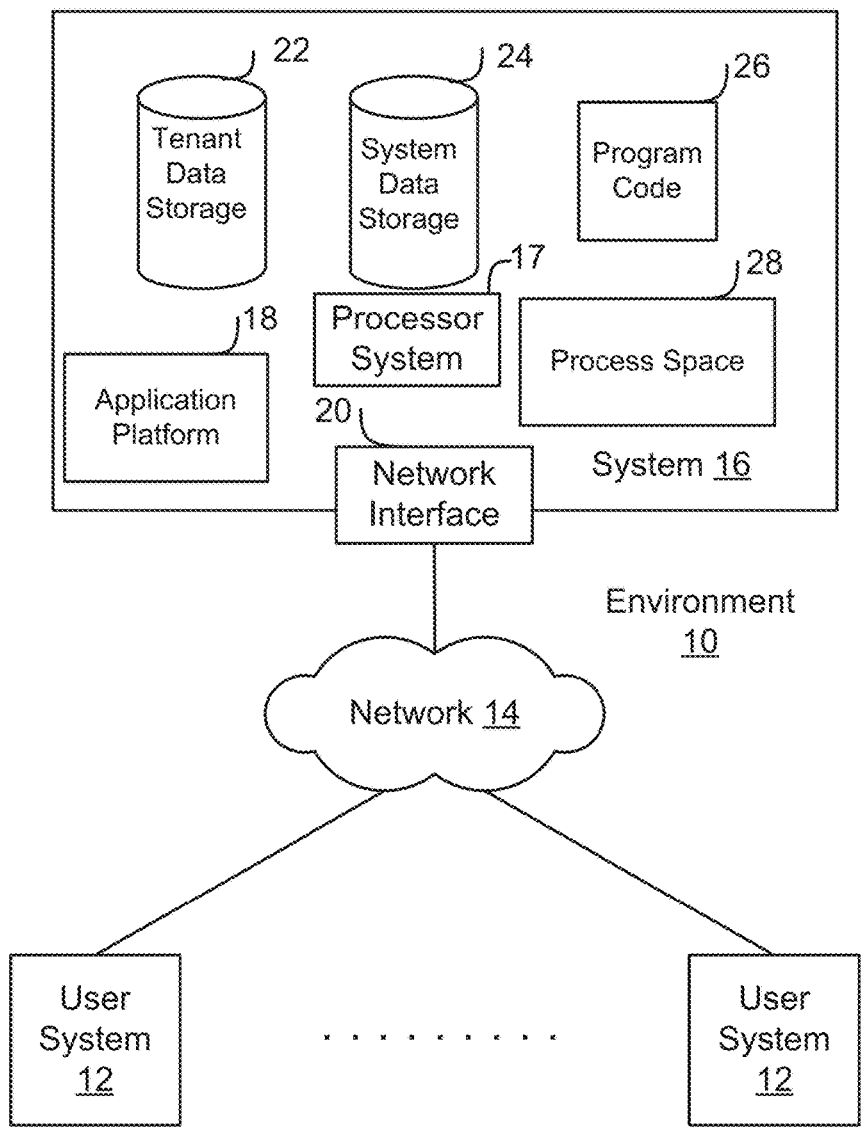
FIG. 1A shows a block diagram of an example environment in which an on-demand database service can be used according to some implementations.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
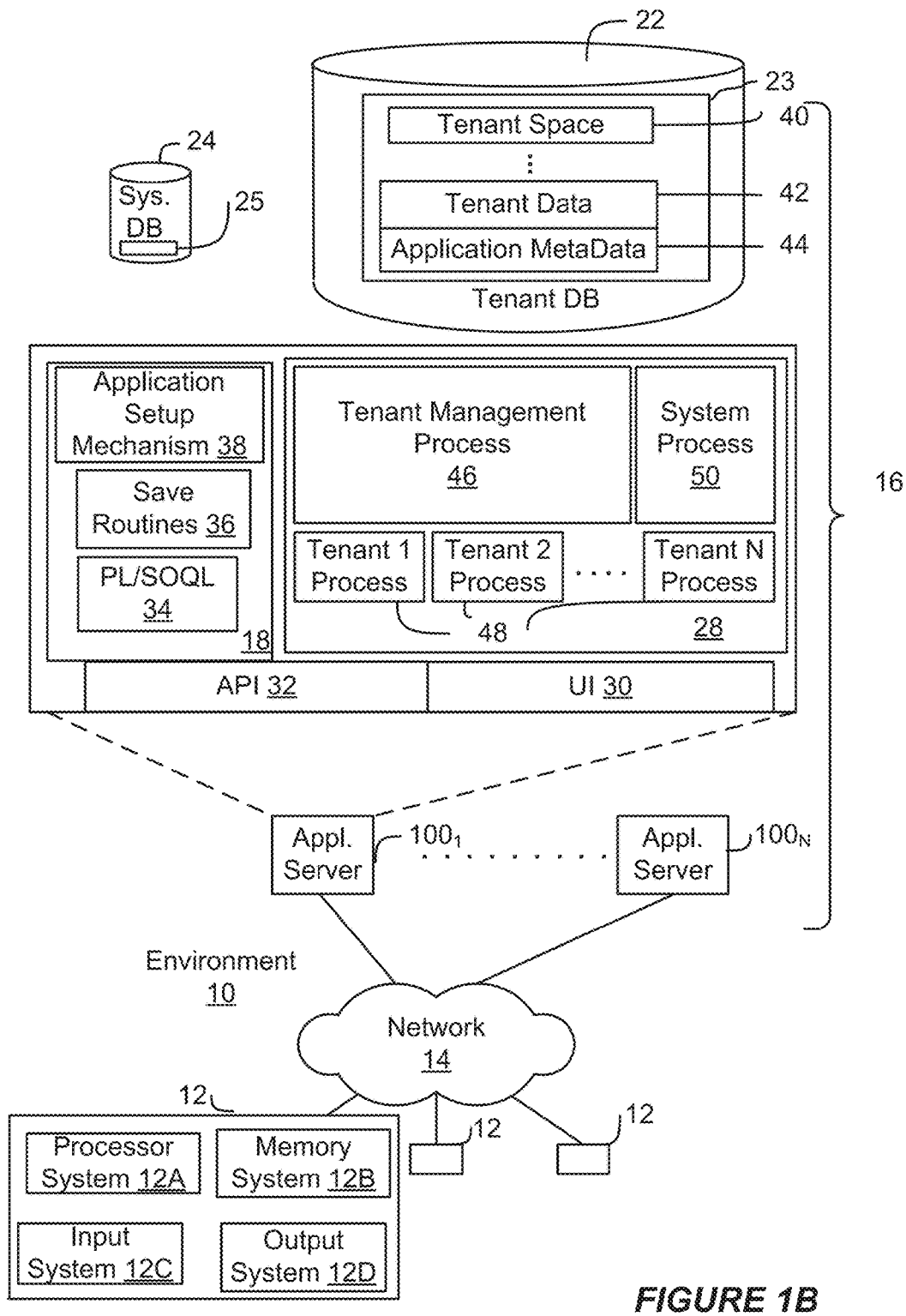
FIG. 1B shows a block diagram of example implementations of elements of FIG. 1A and example interconnections among these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 40, which can be physically or logically arranged or divided. Within each tenant storage space 40, user storage 42 and application metadata 44 can similarly be allocated for each user. For example, a copy of a user's most recently used (MRU) items can be stored to user storage 42. Similarly, a copy of MRU items for an entire organization that is a tenant can be stored to tenant storage space 40.

The process space 28 includes system process space 102, individual tenant process spaces 48 and a tenant management process space 46. The application platform 18 includes an application setup mechanism 38 that supports application developers' creation and management of applications. Such applications and others can be saved as metadata into tenant database 22 by save routines 36 for execution by subscribers as one or more tenant process spaces 48 managed by tenant management process 46, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 44 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. User Authentication Services

User authentication may be used to limit access (login) to a host or database system to only authorized users. Historically, this was done with a username-password pair, where the password is kept confidential. However, storing passwords in the system presents a risk of compromise, for example, when a hacker breaks into the password datastore.

Figure 2:
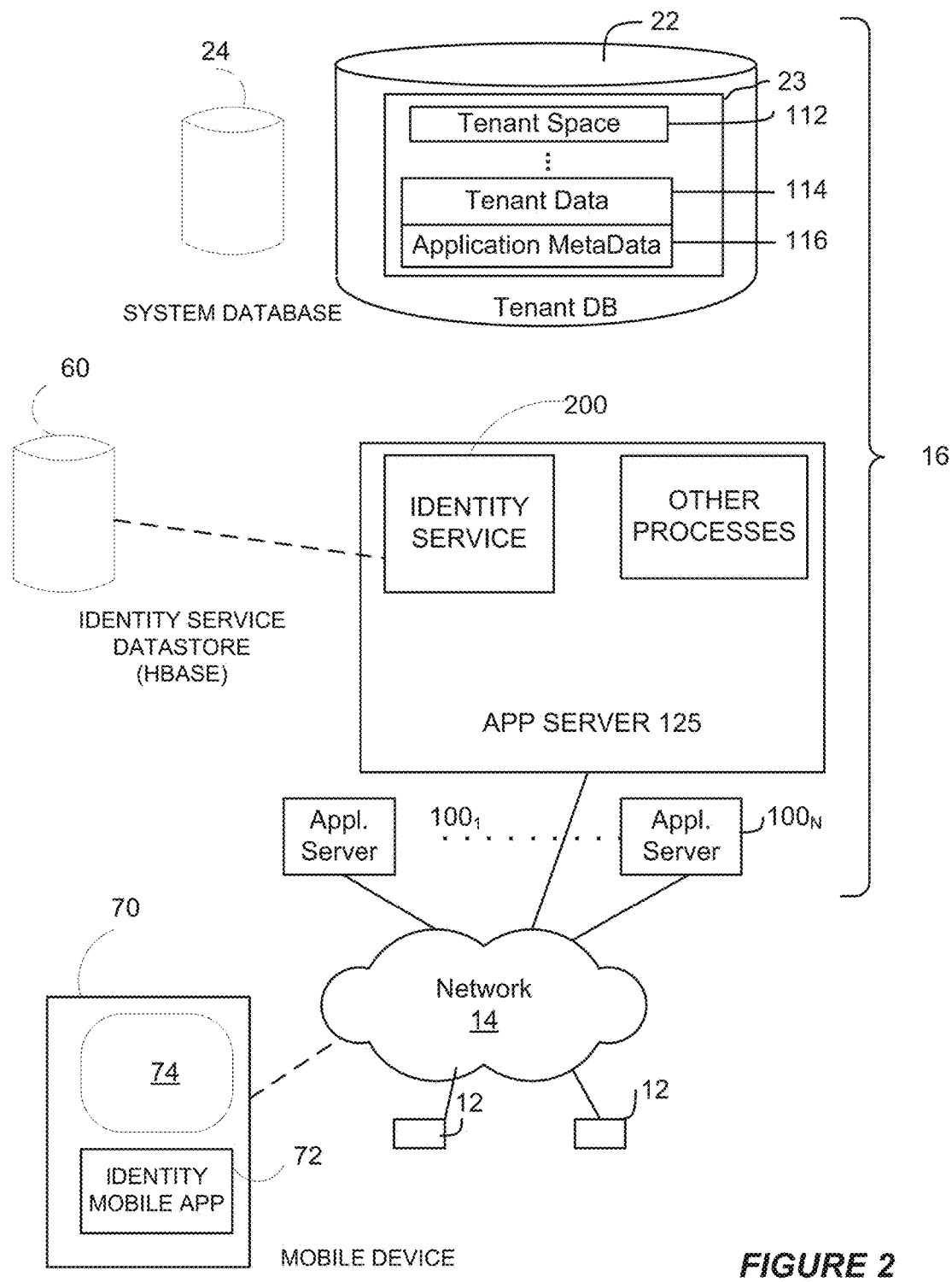
FIG. 2 shows a simplified block diagram of example implementations in which an identity service is provisioned in a database service for user authentication consistent with the present disclosure.

FIG. 2 shows a simplified block diagram of example implementations in which an identity service is provisioned in a database service 16 for user authentication. Selected elements of FIGS. 1A and 1B are shown, with the reference numbers retained. Here, in app server 125, an identity service 200, typically implemented in software, is provided. A similar identity service instance may be implemented in some or all of the other app servers, $100_1$-$100_N$. In other embodiments, multiple app servers may use a common identity service (not shown) for user authentication.

The identity service 200 has access to a datastore 60. There it may store user information further described below. In an embodiment, the stored user data may comprise, for each user, an identifier (for example, a username) and an encryption key, generally comprising a public key and a corresponding private key. The identity service datastore 60 preferably is distinct from the system database 24 which may be, for example, a relational database system. The identity service datastore 60 may be implemented in an HBASE or other datastore of that general type. HBase is an open source, non-relational, distributed database modeled after Google's BigTable and is written in Java. It is developed as part of Apache Software Foundation's Apache Hadoop project. The identity user data in datastore 60 may be backed up in the system database 24 or other datastore in system 16.

A mobile device, for example, a smartphone 70 has the ability to communicate with the system 16, and more specifically with an app server 125, over network 14. The mobile device may utilize a web browser or other suitable app to access resources in the system 16. To do so, the user must first login to the system, which requires authentication of the user. Authentication may be carried out by the identity service 200 or similar program running on or coupled to the app server 125. The ID service 200 generally interacts with a suitably-configured client side application to conduct user authentication. The client side application may be an identity user app 72 installed on the mobile device 70. In other embodiments, similar functionality may be implemented in browser plug-in, scripts, or other methods. In the following description, we use a client side application or "app" to describe an embodiment by way of example and not limitation.

FIG. 3A shows a simplified flow diagram of an example process for user registration and setup that may be implemented in a client side application. At block 302, a user may register with an identity service, for example, 200 (FIG. 2) to set up an authentication account. The primary purpose is to enable subsequent secure login to a selected software service without relying on traditional use of a password. In an embodiment, a password may still be used for added security; but the illustrated process makes use of a password unnecessary. The client app provisions the user and pairs the user with at least one mobile device, block 304. A user may be associated with multiple devices. Conversely, multiple users may utilize the same mobile device. Device identification through various means are known.

The app creates or acquires an asymmetric encryption key pair for the user, using methods that are known. For example, a key pair may be acquired using RSA or ElGamal technologies. The key pair consists of a public key and a corresponding private key. Modern security standards recommend that the key length (referring to the private key exponent) be at least 2096 bits or higher, as longer keys provide better security. The exact key length is not critical to the concepts in this disclosure.

Next, the process of FIG. 3A splits the private key into plural key fragments. In one example, the process may split the private key into three fragments, block 306, as follows. A user-selected PIN, which generally is not the PIN used to access a mobile device at a lockscreen, is used to determine a first fragment of the private key. The PIN preferably comprises at least four decimal digits, and it should be memorized by the user. The PIN itself may be used as a first one of the segments in the three-fragment example. In this example, the PIN should not be stored on the client device. The client app may request that the user input her PIN during the process of FIG. 3A. Preferably, the PIN is specific to the client application/device and a specific private key. Different PINS may be used for different applications, service providers (information systems), etc.

Second and third fragments (i.e., additional, non-identical fragments) of the private key may be calculated as follows: First, subtract the first fragment (the user's PIN) from the private key to form a difference; randomly select a non-zero portion of the difference to form the second fragment; and finally, subtracting the first fragment and the second fragment from the private key to form the third fragment, so that an arithmetic sum of the first, second and third fragments equals the private key value.

At block 308, the second fragment may be stored locally in the mobile device. The second fragment preferably may be secured. In some embodiments, one or two fragments may be secured in the mobile device, for example in a "key chain." The Apple iCloud Keychain for example, protects passwords, credit card data, and other information on a device, as well as in transit, using encryption. In some embodiments, one or two fragments may be secured in the mobile device by requiring a biometric input of a user to access it. The biometric input may be, for example, a fingerprint or facial image or retinal scan. These inputs may be acquired by suitable sensors or devices that are integral to the mobile device or coupled to it (for example, a dongle). In general, one or more of the private key fragments must be stored under control of the mobile device and its user. The entire private key should not be retained. At block 310, the third fragment is to be stored on the identity service, for example, 200 in FIG. 2, as further described below. In a two-fragment embodiment, one fragment is stored under control of the mobile device and its user, and the other fragment is conveyed to the server side.

At block 312, the client app sends the user's public key and at least one fragment of her private key, but not all of the private key, to the identity service to register the user on the server side. The client side app conveniently retains all of the segments that are not sent to the server side, or at least has access to them. In an embodiment, a first segment is not necessarily stored explicitly on the device, but it may be provided by the user in the form of a PIN. Accessing the stored private key segments may involve a hardware dongle or other devices. For example, in a variation on 2FA, a user's smart watch may be required to be near a mobile device for the client app to access one or more of the retained private key fragments. To summarize, in an embodiment, one or more of the split key fragments are sent to the server side identity service, and all of the remaining segments that are not sent to the server side are retained on the client side (or the client side app has access to them). Then the app is ready to manage a remote login request for the user, block 314, as needed.

Figure 5A:
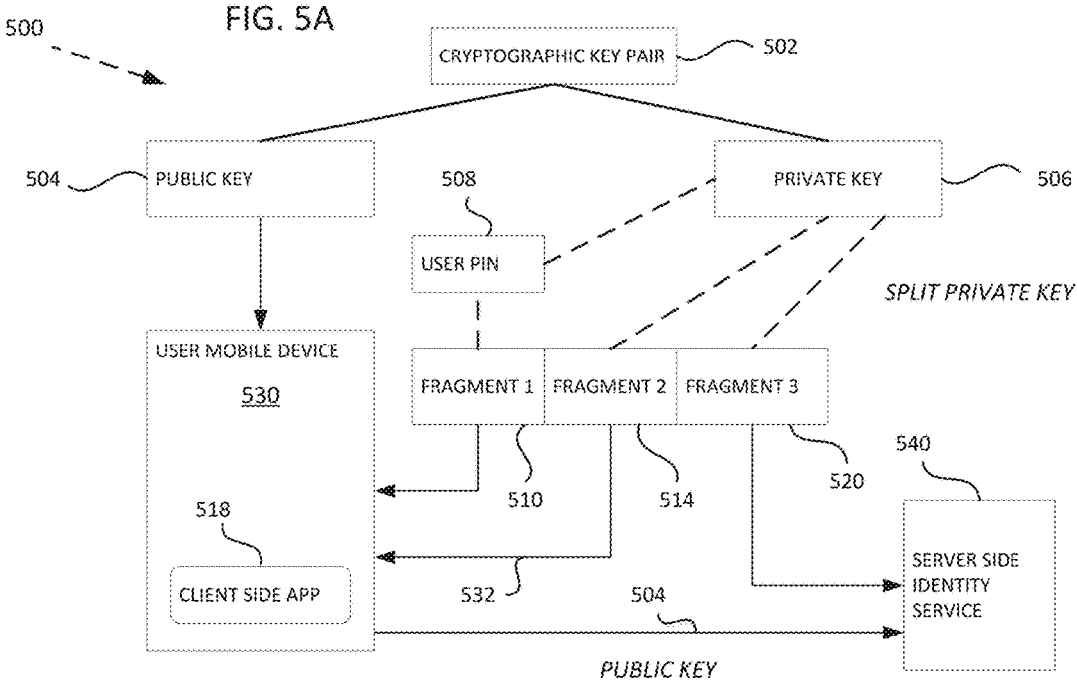
FIG. 5A is a simplified conceptual diagram of a key splitting process in accordance with aspects of the present disclosure to enable secure remote user authentication.

FIG. 5A is a simplified conceptual diagram 500 to further illustrate one example of a private key-splitting registration process in accordance with aspects of the present disclosure to enable secure remote user authentication. A cryptographic key pair, for example, an asymmetric key pair 502 is generated or acquired. The key pair comprises a public key 504 and a private key 506, details of which are known. Typically, the key pair is associated to a single user. The key pair may be acquired by or generated in a user mobile device 530, for example, a smartphone, tablet computer, etc. The key pair thus is accessible to a client side app 518 that is executable on the mobile device. In an embodiment, the app 518 may correspond to the identity mobile app 72 in FIG. 2.

A user PIN 508 may be used to calculate a first fragment 510 of the private key. The first fragment may be formed by subtracting the PIN from the private key. The client app should not store the first fragment 510 in the mobile device 530. A second fragment 514 of the private key may be calculated as described above, and it too stored in the mobile device 530, see path 532. A third fragment 520 also is calculated as described above, and then sent to the server side identity service 540. The public key 504 also is sent to the identity service. The terms "first," "second," etc. in this application do not imply a temporal limitation or sequence; to the contrary, many of the steps described may be accomplished in a different order. Neither do these terms imply any particular limitations, relationships or features of the key fragments; rather, the ordinal adjectives are merely used to distinguish one fragment from its brethren.

The registration process of FIG. 3A generally need be done only once for a given user-device pair. The app may be configured to enable adding additional devices (or removing devices) for the same user. These changes may require sending an update to the server side identity service. Creating and processing a new encryption key pair for a user, generally as described with regard to FIG. 3A, may be done, either by requirement or user option, in response to various events, such as a device malfunction, lost device, or simply the passage of a predetermined time interval. For example, as software and hardware evolve, new longer keys may be advantageous. Utilizing a new key pair may require repeating the registration process.

FIG. 3B shows a simplified flow diagram of an example process for remote user authentication/login that may be implemented in a client side application or authentication service. We assume the user has registered previously, for example, as described above with regard to FIG. 3A. We continue the three-fragment example for illustration. In an embodiment, the user may launch an application or a web browser, and navigate to a remote host, block 320. The remote host may be in a system 16 as illustrated in FIGS. 1A, 1B, and 2.

The user requests login to the remote system, block 322. The request may be handled by an identity service (200 in FIG. 2). The login request typically identifies the user and or device seeking to login. The client side app may wait for a message from the identity service, block 324. The message (or more than one message) conveys at least two things from the system or service to the remote client; namely, (1) a "challenge," encrypted with the user's public key, and (2) a partial decryption result, i.e. a result of decrypting the encrypted challenge using a fragment of the user's private key that was previously provided to the identity service (during registration, see 312 in FIG. 3A). The client side app receives this data, block 326. In some embodiments, either "push" or "pull" models may be implemented for communications between the server side and the client app. Details of various communication protocols and data transfer methods are known. One advantage of the methods described herein is resistance to "man in the middle" attacks.

Next, at block 328, the client side app utilizes the remaining fragments of the user's private key (one or more fragments that were not sent to the server side) to complete decryption of the encrypted challenge. In more detail, in the example that the private key had been split into three fragments (as in FIG. 3A), assume the third fragment is the one sent to the server side during registration. (See 520 in Figure A.) Then the client app would be configured to: (1) decrypt the encrypted challenge using the second fragment to form a second partial decryption result; (2) decrypt the encrypted challenge using the third fragment to form a third partial result; and (3) combine the first, second, and third partial results to recover the challenge, that is, to completely decrypt it. To illustrate, assume the partial results are represented by P1, P2 and P3 respectively, and "Modulus" is the modulus of the user's asymmetric key pair. The following relationships apply to recover the challenge:
Equations $$P1 = \text{partial result received from server side} = \text{encyptedChallenge.modPow(fragmentOne, Modulus)} \quad \text{(EQN. 1)}$$

$$P2 = \text{encyptedChallenge.modPow(fragmentTwo, Modulus)} \quad \text{(EQN. 2)}$$

$$P3 = \text{encyptedChallenge.modPow(fragmentThree, Modulus)} \quad \text{(EQN. 3)}$$

$$(\text{decrypted})\text{Challenge} = (P1 \times P2 \times P3) \bmod \text{Modulus} \quad \text{(EQN. 4)}$$

Figure 4:
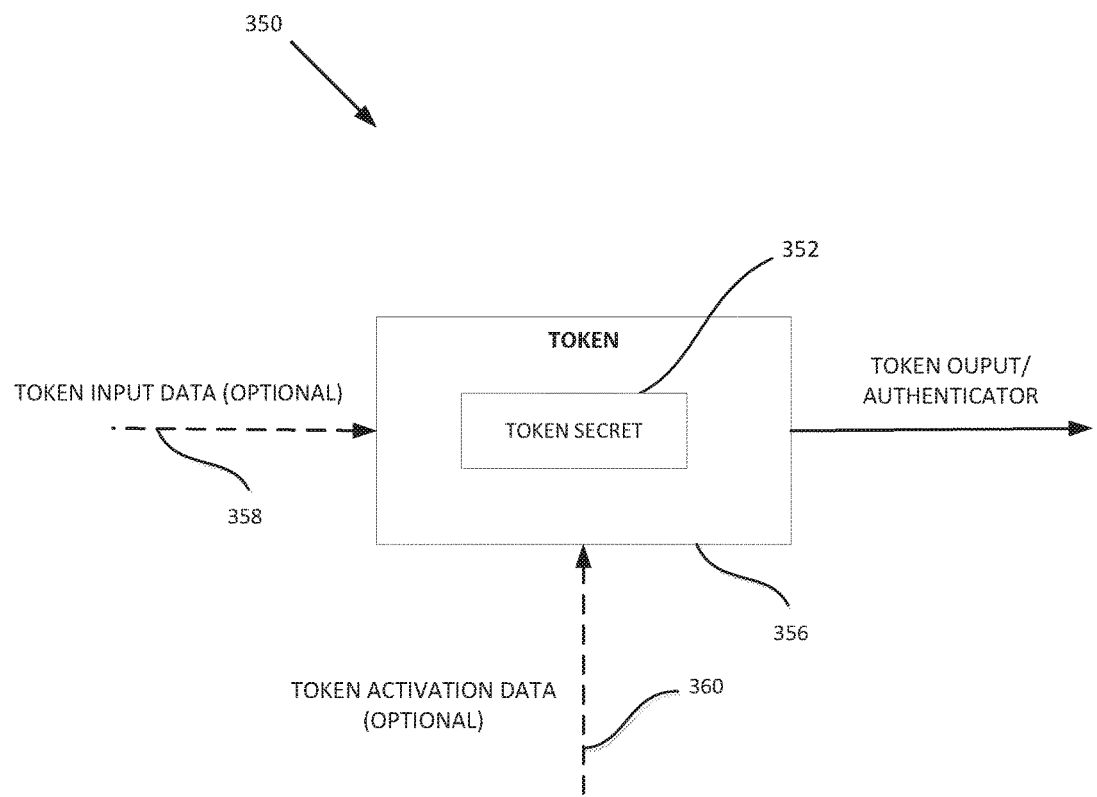
FIG. 4 is a conceptual model of a token used in authentication processes.

Next, the client app processes the decrypted challenge (Eqn. 4) to form a reply to the identity service, block 330. This reply may comprise a "token authenticator," where the corresponding token secret (352 in FIG. 4) comprises the one or more key fragments controlled by the client app. In general, a token may be modeled as an entity that contains a secret to be used in authentication processes. Tokens are generally possessed by a "Claimant" (in the present example, the remote device/user), and controlled through one or more of the traditional authentication factors (something you know, have, or are). FIG. 4 depicts an abstract model for a token. The token authenticator proves that the client app/user has access to the token key fragment(s). In this model, the token input data 358 may comprise the decrypted challenge.

In one embodiment, the token authenticator may include the entire (decrypted) challenge explicitly. In other cases, the token authenticator may comprise one or more values derived from the challenge. For example, the token authenticator may include a cryptographic (one-way) hash of the decrypted challenge or perform key a derivation function using the decrypted challenge to produce a token authenticator. A Hash function is a function that maps a bit string of arbitrary length to a fixed length bit string. Approved hash functions satisfy the following properties: 1. (One-way) It is computationally infeasible to find any input that maps to any pre-specified output, and 2. (Collision resistant) It is computationally infeasible to find any two distinct inputs that map to the same output.

In an embodiment, the token authenticator may comprise a SipHash of the decrypted challenge. Other functions of the challenge may be used. Optionally, other token input data 358 and or token activation data 360 may be employed in generating the token authenticator. For example, token input data (aside from the challenge) may be supplied by the user or be a feature of the token itself (e.g. the clock in an OTP device).

Token authenticators generally are much smaller than the challenge itself, although this is not a requirement. Cryptographic [one-way] hash function functions, among others, may help to make the token authenticators harder to reverse engineer. The function of the token authenticator again is to prove to the identity service that the challenge was successfully decrypted on the client side, thus proving that the client app/user had possession of (or access to) at least the remaining part(s) of the private key that was not provided to the identity service. The selected token authenticator is sent to the identity service, block 332. The service checks the reply for validity, as further described below, and if it is valid, login is permitted, block 340. This arrangement is especially advantageous because users don't have to remember complex passwords, or rotate them. The private key may never be re-assembled after key splitting. Mass compromise is extremely hard, in part because the server side stores only a user's public key and a fragment of her private key. That data is of little or no value to a hacker.

Figure 5B:
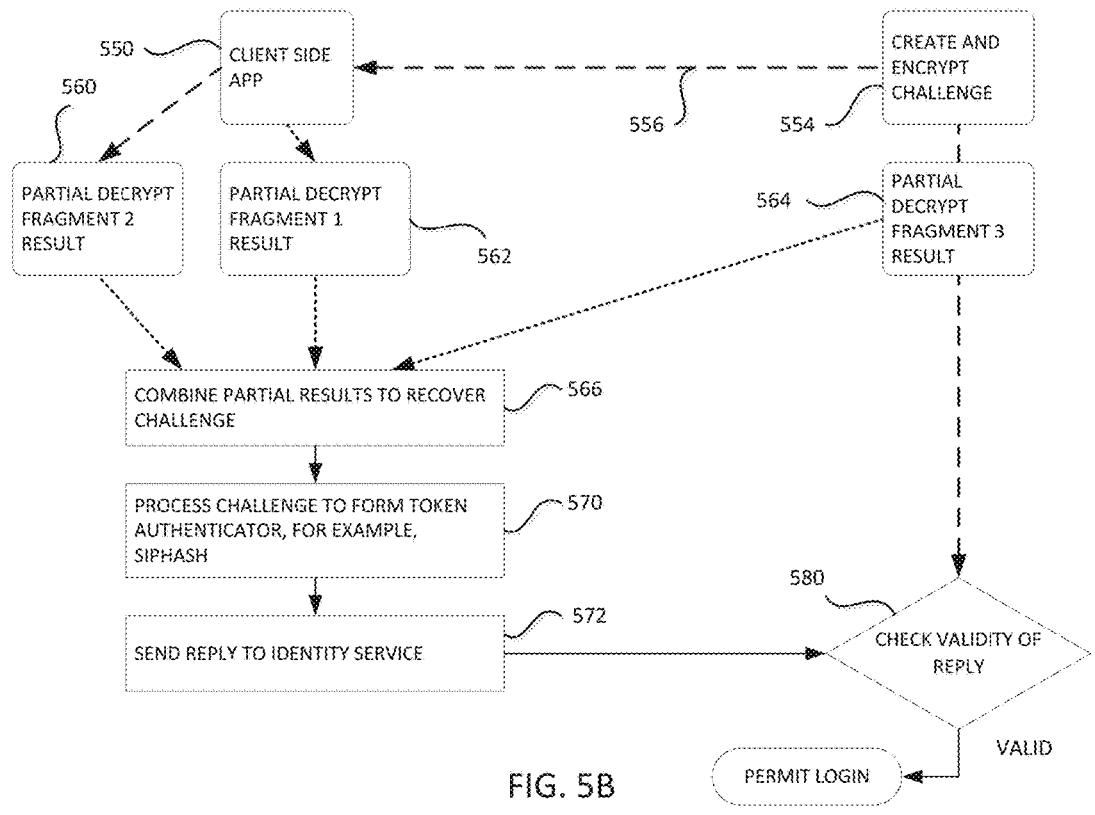
FIG. 5B is a simplified conceptual diagram of a remote login process in accordance with aspects of the present disclosure to enable secure remote user login without requiring a password.

FIG. 5B is a simplified conceptual diagram of a remote login process in accordance with aspects of the present disclosure to enable secure remote user login without requiring a password. In this figure, the operations on the right side are carried out at a server, for example, an app server 125 in FIG. 2. These functions may be implemented in an identity service application, illustrated as 200 in FIG. 2. Returning to FIG. 5B, it assumes that a client side application 550 has made a login request. The server side creates and encrypts a challenge, block 554, and transmits it to the requesting client app via a communication path 556, which may comprise a network. The client side app 550 receives the encrypted challenge. That app conducts a partial decryption of the challenge using a fragment of the user's private key, in this illustration Fragment 2, to form a partial result, block 560. The app also conducts a partial decryption of the challenge using another fragment of the user's private key, in this illustration Fragment 1, to form another partial result, block 562. Illustrative equations are given above. The identity service application on the server side conducts a partial decryption of the encrypted challenge, block 564, using yet another fragment (Fragment 3) of the private key. In an embodiment, the "private key" refers more specifically to the private key of an asymmetric encryption key pair. The identity service application sends a partial result (the Fragment 3 decryption result) to the client side app 550.

The client side app then combines the three partial results, block 566, to recover the challenge. In an embodiment, this combination may be calculated as shown in EQN. 4 above. Next, the app may process the recovered challenge to form a token authenticator, block 570. As discussed above, the token authenticator may comprise a function of the challenge, for example, a hash function of the challenge. It may comprise a Sip Hash of the challenge. Other functions may be used. Hash-type functions reduce the size of the message as compared to sending the entire challenge. Then the client side app sends a reply message comprising the token authenticator, block 572, to the server side, where the identity service checks the reply for validity, decision 580. More details of validity checking are given above with regard to FIG. 4B. If applicable validity checks are passed, the requested login is permitted.

FIG. 6A shows a simplified flow diagram of an example process for user registration and setup that may be implemented in a server side identity service, such as service 200 (FIG. 2). The process may begin with establishment of a communication session with a client application, block 602. The process may register a user and at least one identified user device associated (or "paired") with the user, and store the data in an appropriate datastore, block 604. In an embodiment, the identity service may have access to a datastore external to the server on which the identity service may be operable for storing user registration data. For example, a common external datastore may store user registration data for a plurality of servers. The datastore may be a HBASE datastore as described above with regard to FIG. 2.

The user is associated with two (or more) asymmetric cryptographic key pairs, each key pair comprising a public key and associated private key. These are referred to as first and second key pairs. At block 606, the identity service may receive the user's first public key and a fragment of the user's first private key, based on key splitting as described earlier. At block 608, the identity service receives the user's second public key, that is, the public key of the user's second key pair. The received data may be stored in the corresponding user's data record on the server side, block 601. The registration process may terminate at 620.

FIG. 6B shows a simplified flow diagram of an example process for remote user authentication and login that may be implemented in a server side identity service (the "service"). At block 630, the service may receive a login request from a remote user. The request may be initiated by an application on a remote device. The service may identify the user and/or her device from the request, and thus have access to authentication data previously stored during registration of the user. The service generates a first random challenge and a second random challenge, block 622.

The challenges may be generated by a random number generator. Preferably, each challenge should be generated by a cryptographically robust random number generator. Each challenge may have a selected bit length on the order of the user's public key modulus length, say for example, on the order of 2,096 bits. The exact number of bits is not critical, although the challenge should not be equal to the modulus in length. More generally, the challenge generation should meet good security design practices. In an embodiment, the two random challenges may be generated for each login request, even if the request is from a user already or recently logged in.

Next, at block 634, the service encrypts the first challenge using the user's first public key. In an embodiment, the encryption may be done using a suitable code statement such as, "BigInteger encryptedChallenge=challenge.modPow (PUBLIC_EXPONENT, MODULUS)." The encrypted first challenge is sent to the remote device making the login request. Further, the service encrypts the second challenge using the user's second public key, block 636, and also sends the encrypted second challenge to the remote device.

The service also may partially decrypt the first encrypted challenge using a stored fragment of the user's first private key, block 640. The first private key fragment may be stored in local or a separate datastore accessible to the identity service. For example, to illustrate in pseudocode, if the first private key fragment fragment accessible to the service is "FragmentThree," the partial decryption result may be realized by "BigInteger partial result3=encryptedChallenge.modPow (FragementThree, MODULUS)." The service also sends the partial encryption result to the remote device.

Regarding key fragmentation, in some cases, there may be no PIN. In an embodiment, a first fragment may be determined by subtracting a randomly selected number from the private key. The remainder may be randomly split to form second and third fragments. In another embodiment, there may be only two fragments. For example, first and second fragments may be formed by randomly splitting the private key into two parts; that is, subtracting a random portion from the private key to form the first fragment, and then the remainder becomes the other (second) fragment. In pseudocode, "BigInteger FragmentOne=(RAN<1.0)×Private_Exponent; BigInteger FragmentTwo=Private_Exponent.subtract(FragmentOne)."

Referring again to FIG. 6B, the service receives a reply message from the remote device requesting login, block 642. The reply message includes a token authenticator. In some alternative arrangements, the service may "pull" a reply from the remote device. Various known communication protocols may be used (or one later developed). After receiving a reply message, the service may apply one or more validity tests to the reply message, decision 644, including a test whether the token authenticator is valid, decision 650. A valid token authenticator will demonstrate that the first and second random challenges were correctly decrypted at the remote device. A token may be based algorithmically on the two decrypted challenges. It may, for example, be a simple sum or concatenation of the two. In some embodiments, the token may be formed by a hash function applied to the two decrypted challenges. It may comprise a Sip Hash.

Other validity tests may be applied to the reply message as well. The service may check a "time to live" (TTL) of the challenges. If the TTL has expired, the login may be rejected. In an embodiment, the service may check a geographic location of the remote device, and apply predetermined geographic restrictions. If the device apparently is outside of a permitted area, the login may be rejected. Another test may determine whether the user/device is already logged in, i.e. a corresponding session already exists. Logic may be applied to permit one session and terminate the other. In another example, a maximum number of login tries, say three, may be applied. These and other tests may be applied in various combinations to improve security. If the token authenticator is valid and any applicable other tests are passed, the process permits login, block 660.

Figure 6C:
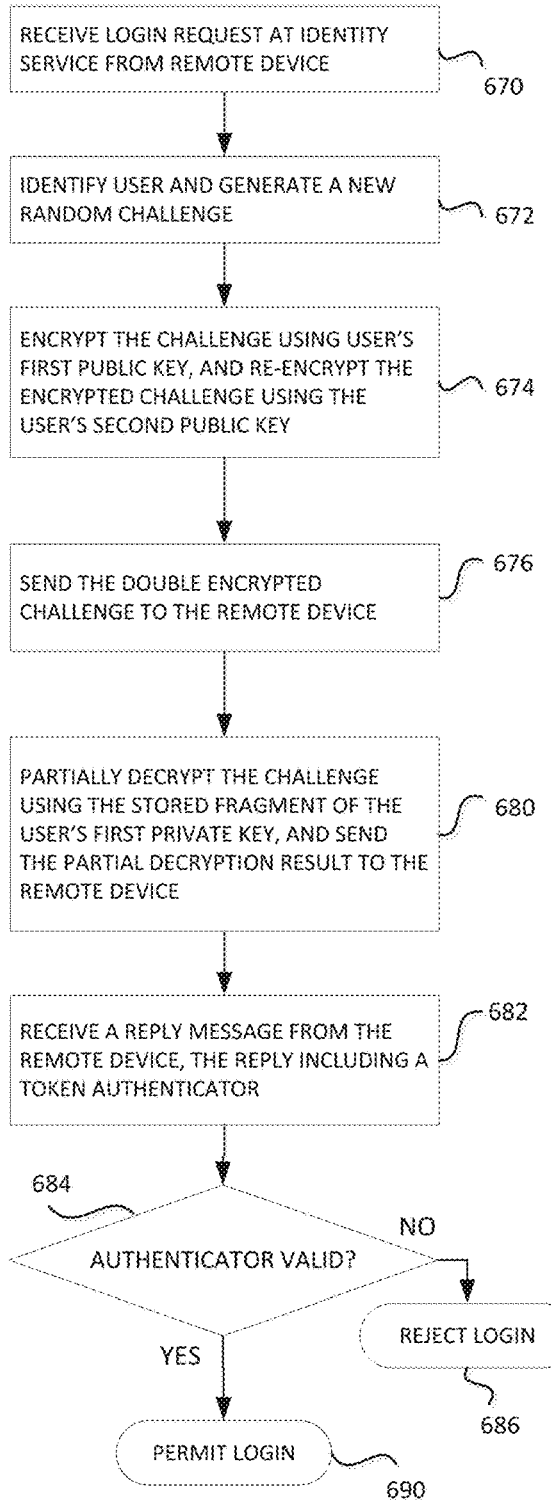
FIG. 6C shows a simplified flow diagram of an alternative server side process for user authentication utilizing two asymmetric cryptography key pairs to encrypt a random challenge.

An alternative embodiment is illustrated in FIG. 6C. In this example, a single random challenge is first encrypted with the user's first public key, and then the encrypted challenge is "rewrapped" or encrypted again, using the user's second public key. Consequently, the remote device will have to unwrap twice to achieve the same results and generate a token authenticator. In more detail, referring to FIG. 6C, the service receives a login request, block 670. The service identifies the user/remote device as before, and generates a new random challenge, block 672. The service encrypts the random challenge using the user's first public key, and then re-encrypts the encrypted challenge using the user's second public key, block 674. The result we refer to as a "double encrypted" challenge. Next the service sends the double encrypted challenge to the remote device, block 676. Further, the service partially decrypts the challenge using the stored fragment of the user's first private key, and sends the partial decryption result to the remote device, block 680. The service subsequently receives a reply message, block 682, the reply including a token authenticator as before. The service checks the token authenticator for validity, decision 684, and then permits login 690 or rejects the login request 686 as appropriate.

FIG. 7A is a simplified flow diagram of an example process for checking validity of a token authenticator in connection with a pair of random challenges. That is, this process for checking the token authenticator corresponds to the server side login process of FIG. 6B. Here, a service receives a reply message, for example, from a remote client device, with a token authenticator, block 702. The service accesses first and second random challenges that it previously sent to the client device (in encrypted form) in connection with a pending login request, block 704. Next, the process combines the first and second challenges to form a reference token, block 714. They may be combined in various ways, but they must be combined using the same process as that used by the client app in generating the token authenticator. Next, the process compares the token received from the client device to the reference token, block 716. If the token authenticator matches the reference token, decision 720, login may be permitted, block 740. Optionally, other validity checks may be performed, block 730, some examples of which were mentioned above.

FIG. 7B is a simplified flow diagram of an alternative process for checking validity of a token authenticator in connection with a single challenge that has been double encrypted. As before, the service receives a reply, block 752, with a token authenticator. The service accesses the corresponding random challenge (which it had generated earlier), block 754. The service then processes the random challenge to form a token authenticator; namely, a "reference token" formed in the same manner as the remote client device application is configured to form a token authenticator based on the (unencrypted) challenge, block 756. Next, the service compares the token received in the reply message to the reference token, block 758. Decision 760 determines whether the two tokens match. If they do not match, the login is rejected, terminus 762. Alternatively, if the tokens match, other optional validity checks may be conducted, block 766. Some examples were given above. Finally, if the other validity checks, if any are applied, are satisfied, the login is permitted, terminus 770.

Figure 8:
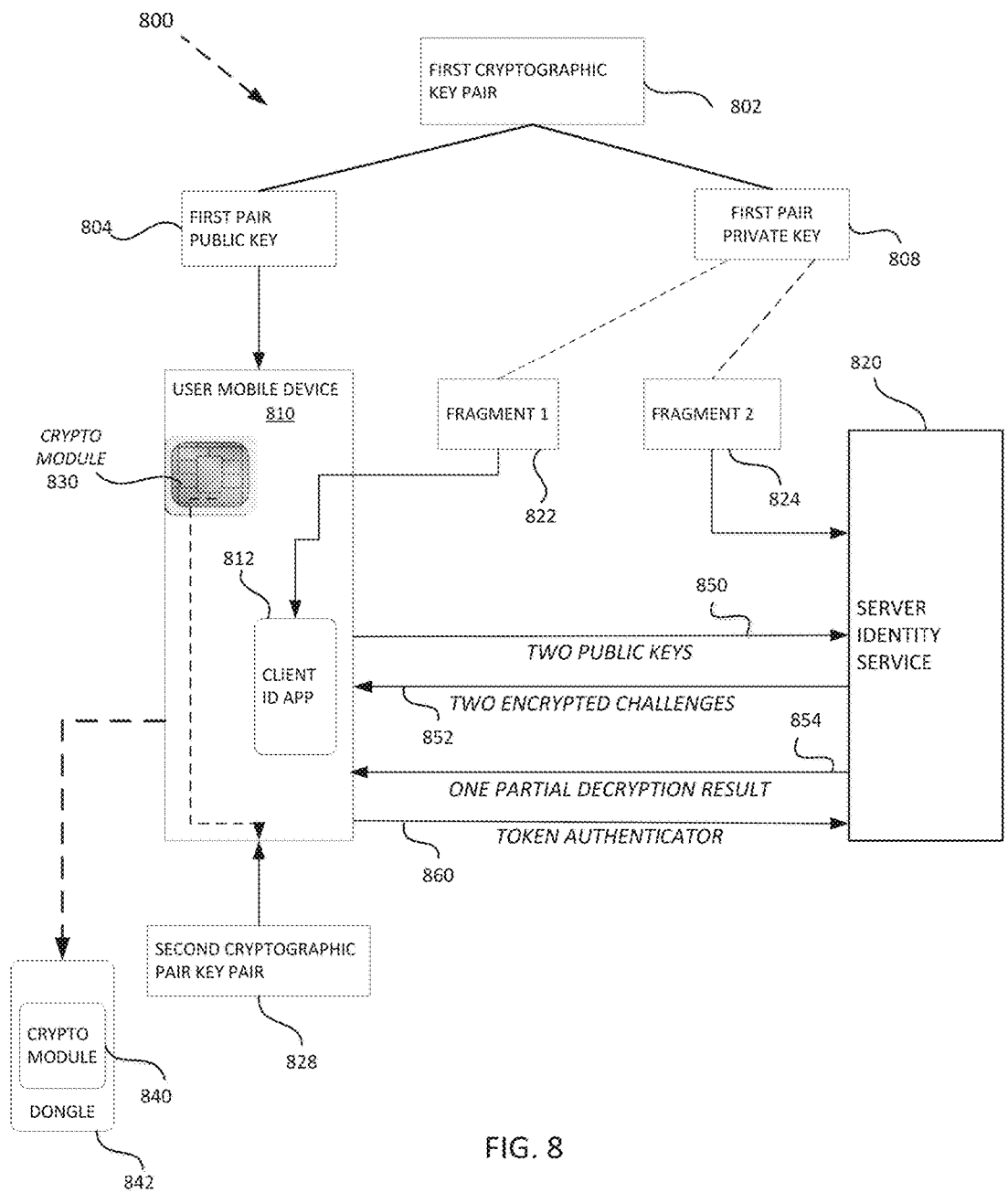
FIG. 8 is a simplified block diagram illustrating operation of an authentication system consistent with the present disclosure.

FIG. 8 is a simplified block diagram illustrating operation of an authentication system 800. A first asymmetric cryptographic key pair 802 comprises a public key 804 and a corresponding private key 808. A user mobile device, preferable a portable mobile device 810, may be a smart phone, laptop computer, tablet, watch or other portable device having a digital processor capable of executing instructions. Here, the mobile device 810 has a client ID or authentication app 812 operatively installed to carry out the functionality that follows. The mobile device 810 further includes communications capability (not shown) such a network or wireless connection. On the server side, a server identity service 820, preferably implemented in software, may be provisioned on a server. An example may correspond to the identity service 200 in FIG. 2. The identity service (or host server) also has communications capability. In some embodiments, the service 820 interacts over said communications links with the client app 812 on the user mobile device to authenticate a user to permit login to an information resource.

The first pair public key 804 is provided to (or generated by) the user mobile device 810. The corresponding first pair private key 808 is divided into two or more fragments; just two fragments are used in this example. Key fragmentation is describe more detail above with regard to FIG. 5A. A first fragment 822 is provided to the user mobile device 810. In an embodiment, the first fragment may be provided to the client app 812 and stored in memory. The second fragment 824 is provided to the ID service 820 and there retained (or stored in a datastore accessible to the ID service as needed). A second asymmetric cryptographic key pair 828 is provided to the mobile device 810. Preferably, the second key pair is retained in a secure cryptographic module 830 which may be coupled to or installed in the device 810. In one example, a secure crypto module 840 may be provisioned in an external dongle 842 or a SIM card (not shown). Preferably the crypto module (830, 840) complies with FIPS PUB 140-2.

Operation of the system 800 was outlined in FIG. 6B with focus on the server side. In FIG. 8, the two public keys (i.e., the public keys of the first and second key pairs 802 and 828) are provided to the ID service, path 850. The ID service 820 generates first and second random challenges, and encrypts a first one of them using a first one of the public keys 804, and encrypts the other challenge using the other public key (from key pair 828). It sends both encrypted challenges to the user mobile device 810, via communication 852. Preferably, the encryption uses two different technologies, for example, RSA and ElGamal, one for each challenge. Preferably, RSA is used on the crypto module, SIM card or hardware dongle, and ElGamal implemented by the client app.

Further, the ID service partially decrypts the first encrypted challenge, using the corresponding private key fragment 824, to form a partial decryption result. The partial decryption result is sent, see path 854, to the mobile device. In the mobile device, the client app 812 uses the other fragment 822 along with the partial decryption result to complete decryption of the first encrypted challenge.

Further, in the device 810, the crypto module 830 decrypts the second encrypted challenge using the private key of the second key pair 828. It may provide the decrypted second challenge to the client app 812. The client app may combine the decrypted first and second challenges to form a result. The client app may then process the result to form a token authenticator, and send the token authenticator, via 860, to the ID service 820 for validation. Validation was described with regard to FIGS. 6B and 7.

This process provides a high level of security in view of several features, including the following.

At least two different asymmetrical cryptographic key pairs are utilized. The chances of both pairs being compromised is essentially nil.

Only a fragment of a private key is stored on the server, which would not be useful to an intruder if compromised.

Two different hardware components are used to decrypt the random challenges.

Processing the two decrypted challenges to form a combination token authenticator provides yet another layer of security.

The complete private key is never transmitted or stored outside the user's device.

In a different embodiment, an alternative server side process for user authentication utilizes two asymmetric cryptography key pairs to encrypt a single random challenge. This process was described above with regard to FIG. 6C and FIG. 7B. In that case, the client device (which may include a dongle, SIM card, etc. as noted) will have to first apply the private key of one of the cryptography key pairs, to unwrap (decrypt) the double encrypted challenge, and then apply the private key of the other one of the key pairs to decrypt the result of the first decryption step and thereby recover the original challenge. As discussed above, one of the decryption steps may be carried out by a crypto module such as 830.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. A user authentication method for an information system comprising the steps of:
  receiving a login attempt at a server from a remote user device;
  based on the login attempt, accessing a first public key and a second public key, both associated with a user, wherein the first and second public keys are each associated with a corresponding private key of an asymmetric cryptographic key pair;
  generating first and second new random challenge messages;
  encrypting the first challenge message using the first public key;
  encrypting the second challenge message using the second public key;
  sending the first and second encrypted challenge messages to the remote user device;
  receiving a reply message from the remote user device;
  verifying the reply message, including determining whether both of the first and second challenge messages were successfully decrypted; and
  based on verifying the reply message, permitting login to the server without requiring a password.

2. The method of claim 1 and further comprising:
  at the server, accessing a fragment of the private key associated with the first public key;
  at the server, partially decrypting the first encrypted challenge message using the fragment to form a partial result; and
  sending the partial result to the remote user device for use in completely decrypting the first encrypted challenge message.

3. The method of claim 2 wherein:
  one of the asymmetric cryptographic key pairs is generated using ElGamal technology; and the other one of the asymmetric cryptographic key pairs is generated using RSA technology.

4. The method of claim 3 wherein the asymmetric cryptographic key pair is generated using ElGamal technology.

5. The method of claim 2 wherein the reply message includes a token authenticator based on the first and second challenge messages.

6. The method of claim 2 and further comprising:
  at the server, storing a timestamp associated with at least one of the first and second challenge messages;
  after receiving the reply message, comparing a current time to the timestamp; and
  based on the comparison, denying the requested login in a case that an elapsed time measured from the timestamp to receiving the reply message exceeds a predetermined time to live.

7. The method of claim 2 wherein the reply message includes a token authenticator, and verifying the reply message includes validating the token authenticator.

8. The method of claim 2 wherein the reply message includes a token authenticator value based on a predetermined cryptographic [one-way] hash function of the first and second decryption results.

9. A user authentication method for an information system comprising the steps of:
  receiving a login attempt at a server from a remote user device;
  based on the login attempt, accessing a first public key and a second public key, both associated with a user, wherein the first and second public keys are each associated with a corresponding private key of an asymmetric cryptographic key pair;
  generating a first new random challenge message;
  encrypting the first challenge message using the first public key;
  wrapping the encrypted first challenge message using the second public key;
  sending the double wrapped encrypted challenge message to the remote user device;
  receiving a reply message from the remote user device;
  verifying the reply message, including determining whether the double wrapped challenge message was successfully decrypted; and
  based on verifying the reply message, permitting login to the server without requiring a password.

10. The method of claim 9 and further comprising:
  at the server, accessing a fragment of the private key associated with first public key;
  at the server, partially decrypting the first encrypted challenge message using the fragment to form a partial result; and
  sending the partial result to the remote user device for use in decrypting the challenge message.

11. The method of claim 9 wherein:
  one of the asymmetric cryptographic key pairs is generated using ElGamal technology; and the other one of the asymmetric cryptographic key pairs is generated using RSA technology.

12. The method of claim 11 wherein the asymmetric cryptographic key pair is generated using ElGamal technology.

13. The method of claim 9 wherein the reply message includes a token authenticator based on decrypting the challenge message.

\* \* \* \* \*